（12） United States Patent
Shimanaka et al.

(10) Patent No.: US 11,548,565 B2
(45) Date of Patent: Jan. 10, 2023

(54) SIDE VEHICLE BODY STRUCTURE OF VEHICLE

(71) Applicant: MAZDA MOTOR CORPORATION, Hiroshima (JP)

(72) Inventors: Tsuneki Shimanaka, Aki-gun (JP); Yukiko Yamaguchi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 62 days.

(21) Appl. No.: 17/179,694

(22) Filed: Feb. 19, 2021

(65) Prior Publication Data

US 2021/0276627 A1 Sep. 9, 2021

(30) Foreign Application Priority Data

Mar. 6, 2020 (JP) .............................. JP2020-038731

(51) Int. Cl.
*B62D 25/20* (2006.01)
*B62D 21/15* (2006.01)
*B62D 25/04* (2006.01)
*B60K 13/04* (2006.01)

(52) U.S. Cl.
CPC .......... *B62D 25/2036* (2013.01); *B60K 13/04* (2013.01); *B62D 21/157* (2013.01); *B62D 25/04* (2013.01); *F01N 2340/04* (2013.01)

(58) Field of Classification Search
CPC .. B62D 25/2036; B62D 25/04; B62D 25/025; B62D 23/005; B62D 21/157; B62D 29/008; B60K 13/04; F01N 1/00; F01N 13/0093; F01N 13/02; F01N 2340/04
See application file for complete search history.

(56) References Cited

U.S. PATENT DOCUMENTS

| 5,560,651 A * | 10/1996 | Kami ..................... B60K 13/04 180/311 |
| 2010/0078255 A1* | 4/2010 | Miura .................... B60K 13/04 180/309 |
| 2017/0101134 A1* | 4/2017 | Miyazaki ........... B60H 1/00378 |
| 2018/0072352 A1 | 3/2018 | Shimoda |

FOREIGN PATENT DOCUMENTS

JP  2018-039452 A  3/2018

* cited by examiner

*Primary Examiner* — Grant Moubry
(74) *Attorney, Agent, or Firm* — Studebaker & Brackett PC (57) ABSTRACT

A side vehicle body structure ensures rigidity and shock absorption performance of the body, avoids widening of the body, and smooths the flow of exhaust gas. Embodiments include an engine, an exhaust apparatus, and a rear pillar extending upward from a rear-side portion of a side sill extending in the vehicle front-rear direction. The exhaust apparatus is disposed along the vehicle front-rear direction on the vehicle-width-direction outer side relative to the side sill. An exhaust system member is located at a going-around portion, with respect to the rear pillar, from the front side to the rear side and from the outer side to the inner side in the vehicle width direction. The rear pillar has a cross section orthogonal to the vehicle up-down direction having a shape in which a portion between front and rear ends is located on the vehicle-width-direction outer side relative to these front and rear ends.

5 Claims, 8 Drawing Sheets

SIDE VEHICLE BODY STRUCTURE OF VEHICLE

TECHNICAL FIELD

The present disclosure relates to a side vehicle body structure of a vehicle which includes, for example, an internal combustion engine, an exhaust apparatus through which exhaust gas exhausted from the internal combustion engine passes, and a pillar extending in the up-down direction at a rear-side portion of the vehicle.

BACKGROUND

In a vehicle, a structure has been known in which at least a part of an exhaust system member (for example, a filter for exhaust treatment, an exhaust pipe, or a silencer) forming an exhaust apparatus is provided not at the vehicle-width-direction center under a floor but on the vehicle-width-direction outer side relative to the floor (i.e., a lower portion of the vehicle on the vehicle-width-direction outer side).

The aim of adopting such a configuration is roughly classified into cases where a vehicle body layout property is desired and where motion performance of a vehicle body is to be emphasized. In the former case, for example, in a vehicle adopting a system using an internal combustion engine and a motor in combination as in a hybrid car or a range extender car, a vehicle has been known in which, for example, in order to avoid a battery disposed under a floor, an exhaust system member is provided on the vehicle-width-direction outer side relative to the battery under the floor (for example, see Japanese Patent Laid-Open No. 2018-39452). In the latter case, a vehicle has been known in which, for example, as in a sports car, in order to dispose a heavy object near the center of a vehicle body, an exhaust system member, which is relatively light, is disposed at a lower portion of the vehicle on the vehicle-width-direction outer side.

As an example in which the heavy object is disposed near the center of the vehicle body, the center of gravity of occupants seated on a driver seat and a passenger seat is lowered, or an interval in the vehicle width direction between the driver seat and the passenger seat which are adjacent to each other is narrowed. As a specific example in which the exhaust system member is disposed at the lower portion of the vehicle on the vehicle-width-direction outer side, it is conceivable to lay out the exhaust system member in the vicinity of the vehicle-width-direction outer side of a side sill as a vehicle body structure.

However, in a case where the exhaust system member, which is relatively light, is laid out on the outer side of the side sill, a problem occurs in which the width of the vehicle expands by a width corresponding to that of the exhaust system member; accordingly, there is room for improvement.

A vehicle body is required to have, for example, a shock absorption performance during a collision and a certain rigidity, and these requirements need to be satisfied so as not to sacrifice the vehicle's motion performance as much as possible.

Furthermore, in a case where at least a part of an exhaust apparatus laid out along the vehicle front-rear direction on the vehicle-width-direction outer side of a vehicle body is redirected from the outer side to the inner side in the vehicle width direction on the vehicle rear side, in the exhaust apparatus, an exhaust system member disposed at, in the vehicle front-rear direction, a position adjacent to a pillar provided at a rear portion of the vehicle body needs to be arranged, with respect to the pillar, from forward to rearward and from the outer side to the inner side in the vehicle width direction.

Typically, the exhaust system member is preferably arranged so as to be curved at a smallest possible curvature in a plan view (namely, greatly curved) in order to avoid being a resistance to exhaust gas. However, in a case where the exhaust system member detours toward the vehicle-width-direction outer side at an arrangement portion in order to be curved at the smallest possible curvature in this way, there is a concern that it may lead to widening of the vehicle body. On the other hand, in a case of being moderately curved from the vehicle frontmost possible side of the pillar to the vehicle-width-direction inner side, it may lead to reduction of, in the vehicle width direction, the length (cross-sectional area) of a rigidity member of the pillar as a vehicle-body rigidity member, and consequently there is also a concern about ensuring the shock absorption performance and rigidity of the vehicle body.

SUMMARY

The present disclosure has been made in view of such problems and provides a side vehicle body structure of a vehicle which can achieve the goals of ensuring rigidity of a vehicle body and shock absorption performance thereof, avoiding widening of the vehicle body, and smoothing the flow of exhaust gas in an exhaust system member.

The present disclosure relates to a side vehicle body structure of a vehicle which includes an internal combustion engine, an exhaust apparatus through which exhaust gas exhausted from the internal combustion engine passes, and a pillar extending in the up-down direction at a rear-side portion of a vehicle body structure extending in the vehicle front-rear direction, wherein the exhaust apparatus is disposed along the vehicle front-rear direction on the vehicle-width-direction outer side relative to the vehicle body structure, an exhaust system member provided in the exhaust apparatus is located at a going-around portion, with respect to the pillar, from the front side to the rear side and from the outer side to the inner side in the vehicle width direction, and the pillar has a cross section orthogonal to the vehicle up-down direction which has a shape in which a portion between front and rear ends is located on the vehicle-width-direction outer side relative to these front and rear ends.

According to this configuration, while the size of the cross section of the pillar which is orthogonal to the vehicle up-down direction is maintained, there is no need to form the exhaust system member in a bent shape corresponding to the shape of the going-around portion, with respect to the pillar, from the front side to the rear side and from the outer side to the inner side in the vehicle width direction, and exhaust gas can smoothly flow in the exhaust system member disposed at the going-around portion. Furthermore, it is possible to avoid great curving in which the exhaust system member detours toward the vehicle-width-direction outer side at the going-around portion.

In short, it is possible to achieve the goals of ensuring rigidity of a vehicle body and shock absorption performance thereof, smoothing exhaust flow of the exhaust system member, and avoiding widening of the vehicle body.

Here, the exhaust system member is not limited to a member such as a GPF including, for example, a filter that treats exhaust gas (gas) from the internal combustion engine and may be, for example, a member having a silencing function such as a silencer or a catalyzer, or an exhaust pipe itself.

Furthermore, the side vehicle body structure of a vehicle of the present disclosure is not limited to a configuration in which the internal combustion engine is provided forward relative to a vehicle cabin, and may have a configuration in which the internal combustion engine is provided rearward.

In an aspect of the present disclosure, the pillar is formed by a closed cross-sectional structure having a cross section orthogonal to the vehicle up-down direction, in which the cross section has a triangular shape having top portions at front and rear ends and on the vehicle-width-direction outer side. According to this configuration, the cross section orthogonal to the vehicle up-down direction can have a truss structure, so that the pillar can be formed as a strong structure.

In another aspect of the present disclosure, the pillar is formed by a vehicle width outer-side closed cross-sectional structure as the closed cross-sectional structure, and a vehicle width inner-side closed cross-sectional structure disposed on the vehicle-width-direction inner side relative to the vehicle width outer-side closed cross-sectional structure and having a cross section orthogonal to the vehicle up-down direction, in which the cross section has a triangular shape having top portions at front and rear ends and on the vehicle-width-direction inner side, and facing faces of the vehicle width outer-side closed cross-sectional structure and the vehicle width inner-side closed cross-sectional structure in the vehicle width direction are formed by being joined so as to be in contact with each other. According to this configuration, the pillar can be formed by combining the pair of closed cross-sectional structures whose cross sections orthogonal to the vehicle up-down direction each have a truss structure, so that rigidity thereof can be further enhanced.

According to the disclosed configuration, it is possible to achieve the goals of ensuring rigidity of the vehicle body and shock absorption performance thereof, avoiding widening of the vehicle body, and smoothing the flow of exhaust gas in the exhaust system member.

DETAILED DESCRIPTION

An embodiment of the present disclosure will be explained with reference to the following drawings. A vehicle of the present embodiment is a sports car adopting a so-called space frame structure coupling a plurality of extruded frames made of an aluminum alloy and forming a vehicle body framework, and adopting a center pillar-less structure in which a side door is of a two-door type. A side vehicle body structure of such a vehicle will be explained with reference to FIGS. 1 to 7.

In order to clarify illustration, in the figures, illustration of a front suspension and a rear suspension is omitted, and detailed illustration of a suspension support member supporting these suspensions, which will be described later, is omitted.

Furthermore, in the figures, arrow F indicates the vehicle front direction; arrow R, the vehicle right direction; arrow L, the vehicle left direction; arrow U, the vehicle upper direction.

Figure 1:
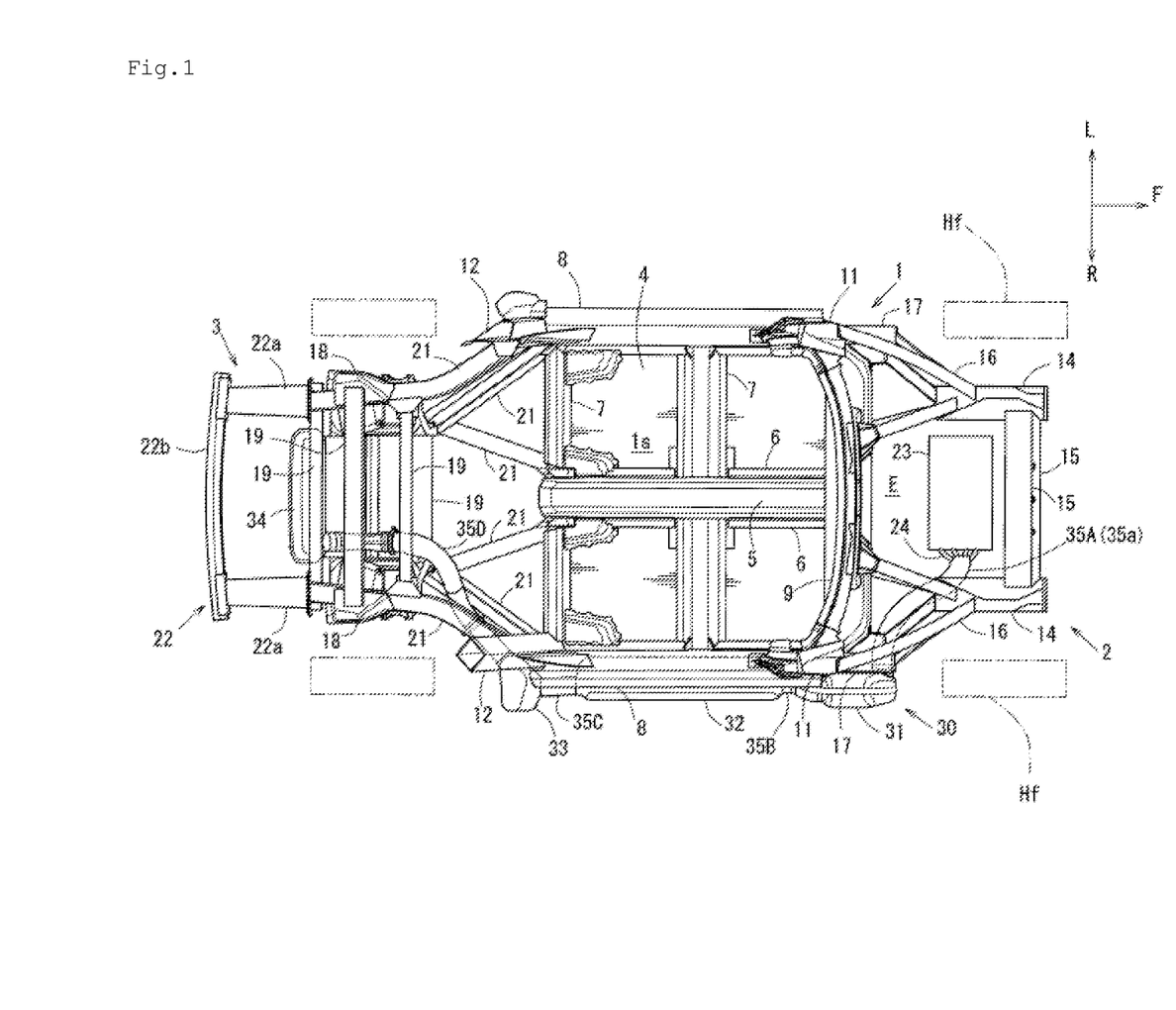
FIG. 1 is a plan view illustrating a main portion of a vehicle including a side vehicle body structure of the present embodiment.
Figure 2:
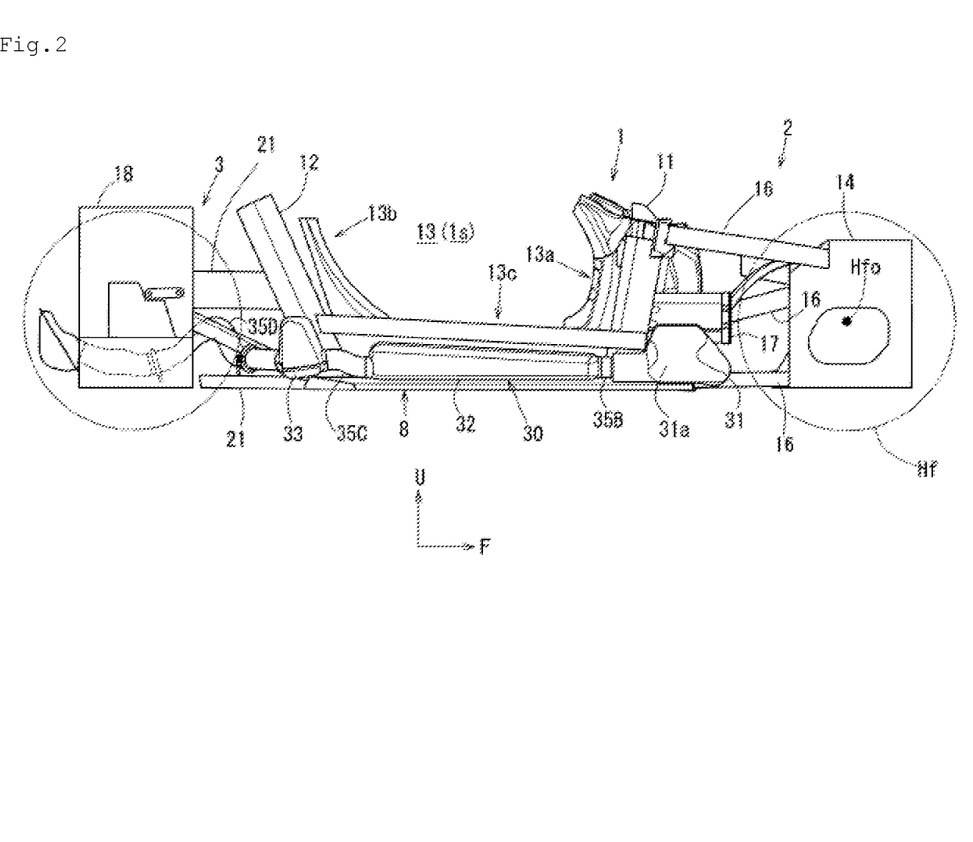
FIG. 2 is a left side view illustrating the main portion of the vehicle including the side vehicle body structure of the present embodiment.

As illustrated in FIGS. 1 and 2, the vehicle including the side vehicle body structure of the present embodiment includes a vehicle cabin 1 for an occupant to get in, a front vehicle body 2 provided on the vehicle front side relative to the vehicle cabin 1, and a rear vehicle body 3 provided on the vehicle rear side relative to the vehicle cabin 1.

As illustrated in FIG. 1, the vehicle cabin 1 and the front vehicle body 2 are partitioned by a dash panel 9 in a raised wall shape. Namely, the dash panel 9 serves as a partition wall defining a front edge of a vehicle cabin space is provided inside the vehicle cabin 1 and is disposed between the vehicle cabin 1 and the front vehicle body 2.

As illustrated in FIG. 1, inside the vehicle cabin 1, provided are a floor panel 4 forming a floor (floor surface) of the vehicle cabin 1, a tunnel frame 5 extending in the vehicle front-rear direction above a center position of the floor panel 4 in the vehicle width direction, a tunnel side frame 6 extending in the vehicle front-rear direction at a corner between a side wall on each of both sides of the tunnel frame 5 and the floor panel 4, and a plurality of floor cross members 7 each coupling the tunnel frame 5 and a side sill 8 in the vehicle width direction.

As further illustrated in FIGS. 1 and 2, both sides of the floor panel 4 of the vehicle cabin 1 in the vehicle width direction include the pair of left and right side sills 8 extending in the vehicle front-rear direction, hinge pillars 11 (front-side pillars) each extending upward from a front end of the side sill 8, and rear pillars 12 (rear-side pillars) each extending upward from a rear end of the side sill 8.

As also illustrated in FIG. 2, on the above-described both sides of the vehicle cabin 1, door openings 13 through which the occupant enters and exits the vehicle cabin 1 are provided. A hinge pillar 11, a rear pillar 12, and the side sill 8 are provided along a front edge 13a of the door opening 13, a rear edge 13b of the door opening 13, and a lower edge 13c of the door opening 13, respectively.

As illustrated in FIGS. 1 and 2, the front vehicle body 2 includes a pair of left and right front suspension support members 14 supporting a front suspension (illustration omitted), a plurality of front-side cross members 15 (see FIG. 1) each coupling the pair of left and right front suspension support members 14 in the vehicle width direction, a plurality of front-side coupling frames 16 each coupling the vehicle cabin 1 and the front suspension support member 14, and a front shock absorption structure (illustration omitted) that absorbs a shock load from the vehicle front side.

As illustrated in FIG. 1, the front suspension support member 14 is located on the vehicle-width-direction inner side of the side sill 8 corresponding to each of the left and right sides and pivotally supports a front wheel Hf via the front suspension, which is not illustrated. The front wheel Hf is provided on the vehicle front side relative to the front end of the side sill 8 and on the vehicle-width-direction outer side relative to the front suspension support member 14. The front suspension support member 14 is manufactured by, for example, die cast molding of an aluminum alloy.

As also illustrated in FIGS. 1 and 2, the front vehicle body 2 includes, at a position spaced apart rearward from the front wheel Hf, a tire stopper frame 17 extending toward the vehicle front side from a front portion of the hinge pillar 11. As illustrated in FIGS. 1 and 2, the above-described tire stopper frame 17 is also referred to as a reinforcement for small overlap collision resistance (reinforcement for SORB) and is a frame for receiving the front wheel Hf receding at the time of small overlap collision, and suppressing entering of the front wheel Hf into the vehicle cabin 1.

The tire stopper frame 17 has a rear end joined to a front face of the hinge pillar 11, and a front end horizontally extending in the vehicle front-rear direction up to a position in front of a rearmost end of the front wheel Hf. Thereby, in the tire stopper frame 17, the front end is disposed at a position spaced apart toward the vehicle rear side from the rearmost end of the front wheel Hf. The tire stopper frame 17 is formed by extrusion in such a manner that a cross section thereof which is orthogonal to the vehicle front-rear direction is formed in a closed cross-sectional shape.

Although illustration is omitted, the front shock absorption structure includes a crash can formed of, for example, a cylindrical body extending in the vehicle front-rear direction from the front end side of the front suspension support member 14, and a bumper reinforcement extending in the vehicle width direction so as to couple front ends of the pair of left and right crash cans.

The rear vehicle body 3 includes a pair of left and right rear suspension support members 18 supporting a rear suspension, a plurality of rear-side cross members 19 (see FIG. 1) each coupling the pair of left and right rear suspension support members 18 in the vehicle width direction, a plurality of rear-side coupling frames 21 each coupling the vehicle cabin 1 and the rear suspension support member 18, and a rear shock absorption structure 22 that absorbs a shock load from the vehicle rear side. Illustration of not only the above-described front shock absorption structure but also the rear shock absorption structure 22 is omitted in FIG. 2.

As illustrated in FIG. 1, the rear shock absorption structure 22 includes a crash can 22a formed of, for example, a cylindrical body extending toward the vehicle rear side from the rear end side of the rear suspension support member 18, and a bumper reinforcement 22b extending in the vehicle width direction so as to couple rear ends of the pair of left and right crash cans 22a.

As illustrated in FIG. 1, in a front portion of the vehicle of the present embodiment, an area between the pair of left and right front suspension support members 14 is formed as an engine room E, and the engine room E is equipped with an engine 23. An exhaust apparatus 30 (exhaust unit) is connected to an exhaust port provided on the side wall side of this engine 23, via an exhaust manifold 24. The exhaust apparatus 30 includes, as exhaust system members, a GPF 31 (gasoline particulate filter), a first pre-silencer 32, a second pre-silencer 33, a main silencer 34, and a tail pipe (illustration omitted). The exhaust manifold 24 and the GPF 31 are connected by a connection part 35A, the above-described exhaust system members 31 and 32 are connected by a connection part 35B, the above-described exhaust system members 32 and 33 are connected by a connection part 35C, and the above-described exhaust system members 33 and 34 are connected by a connection part 35D.

The GPF 31 has a body 31a including a filter that, as an exhaust treatment device that treats exhaust gas of the engine 23, collects a particulate matter (PM) included in the exhaust gas.

Each of the silencers (the first pre-silencer 32, the second pre-silencer 33, and the main silencer 34) reduces a sound when the exhaust gas is released to the atmosphere.

Although the connection parts 35A, 35B, 35C, and 35D are formed by mainly an exhaust pipe 35a, the connection parts 35A, 35B, 35C, and 35D are provided at, as exhaust system members, the GPF 31, the silencers 32, 33, and 34, and the like and also formed to include the exhaust pipe 35a and connection portions having a function of connecting to the other exhaust system members 31, 32, 33, and 34. Each of the connection parts 35A, 35B, 35C, and 35D, not limited to formation including both the exhaust pipe 35a and the connection portion provided in the exhaust system member, can be formed by at least one of these.

In the exhaust apparatus 30, the GPF 31, the first pre-silencer 32, the second pre-silencer 33, and the main silencer 34 are each routed along an exhaust path extending rearward from the front side of the vehicle body via the connection part. In this example, the exhaust apparatus 30 is routed along an exhaust path such that the exhaust path bypasses the vehicle-width-direction outer side (the vehicle right side, in this example) in the middle of extending toward the vehicle rear side. Specifically, the exhaust apparatus 30 is routed in the front vehicle body 2 from, in the vehicle width direction, the inner side equipped with the engine 23 toward the outer side and routed toward the vehicle rear side along a side portion of the vehicle cabin 1, and the exhaust apparatus 30 is routed again in the rear vehicle body 3 from the vehicle-width-direction outer side toward the inner side and routed toward the vehicle rear side. Thus, the exhaust system member, which is relatively light, is laid out on the vehicle-width-direction outer side, so that a heavy object can be laid out at the vehicle center relative to the exhaust system member, consequently contributing to enhancement of a motion performance of the vehicle.

Hereinafter, the vehicle body side structure of the present embodiment will be explained in more detail with reference to FIGS. 3 to 7, in addition to FIGS. 1 and 2.

Figure 5:
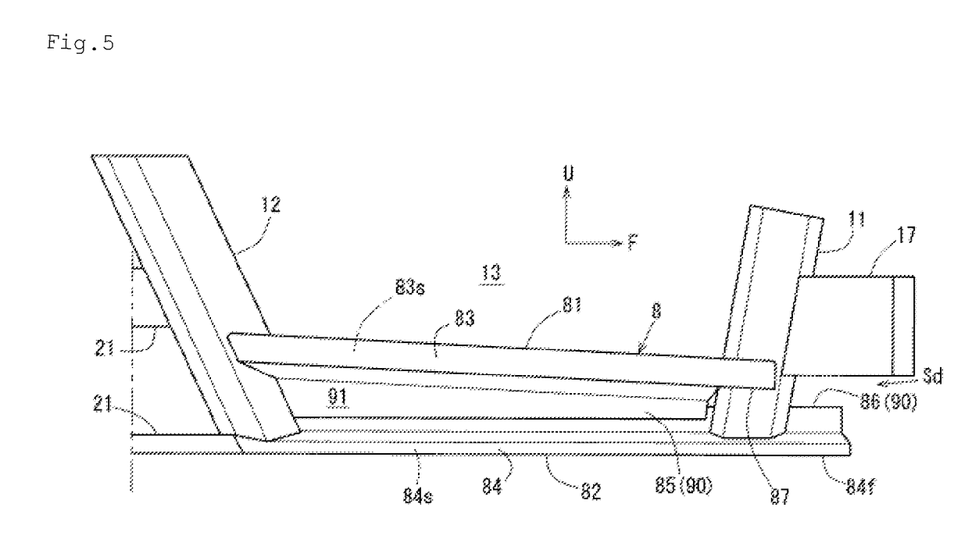
FIG. 5 is a left side view illustrated with an exhaust system member removed from FIG. 4.

As illustrated in FIG. 5, the side sill 8 is configured with a two-divided structure including a side sill upper 81 and a side sill lower 82 on the upper and lower sides. The side sill upper 81 and the side sill lower 82 are both frame members each formed by extrusion of an aluminum alloy material as described above, and respectively have closed cross-sectional spaces 83s and 84s inside which extend over the full length in the vehicle front-rear direction. The side sill upper 81 is formed by integrating a closed cross-section portion 83 (hereinafter also referred to as the "upper-side closed cross-section portion 83") having the closed cross-sectional space 83a inside, and a lower flange 85 extending downward from a vehicle-width-direction inner end of the upper-side closed cross-section portion 83 and a lower end thereof.

Furthermore, as illustrated in the same figure, the side sill lower 82 is formed by integrating a closed cross-section portion 84 (hereinafter also referred to as the "lower-side closed cross-section portion 84") having the closed cross-sectional space 84s inside, and an upper flange 86 extending upward from the vehicle-width-direction inner side of the lower-side closed cross-section portion 84 and an upper end thereof. As illustrated in FIG. 5, the upper-side closed cross-section portion 83 and the lower-side closed cross-section portion 84 both extend in the vehicle front-rear direction so as to overlap with the pillars 11 and 12 on the front and rear sides in a vehicle side view. The side sill lower 82 of the present embodiment extends over the full length of the side sill 8 in the vehicle front-rear direction.

Furthermore, as illustrated in FIG. 2, the upper-side closed cross-section portion 83 and the lower-side closed cross-section portion 84 are both formed to be longer in the vehicle width direction than the pillars 11 and 12 on the front and rear sides. The upper-side closed cross-section portion 83 and the lower-side closed cross-section portion 84 in the present embodiment are both formed so that outer ends thereof in the vehicle width direction project toward the vehicle-width-direction outer side relative to vehicle-width-direction outer faces of the pillars 11 and 12 on the front and rear sides.

As further illustrated in FIG. 5, a lower wall of the lower-side closed cross-section portion 84 is substantially horizontally formed along the vehicle width direction, while an upper wall is moderately inclined so as to be located downward toward the vehicle-width-direction outer side. Thereby, the lower-side closed cross-section portion 84 is formed in a substantially triangular shape in which a cross section orthogonal to the vehicle front-rear direction becomes longer in the vehicle width direction than in the vehicle up-down direction and the length in the vehicle up-down direction becomes shorter toward the vehicle-width-direction outer side.

Figure 6:
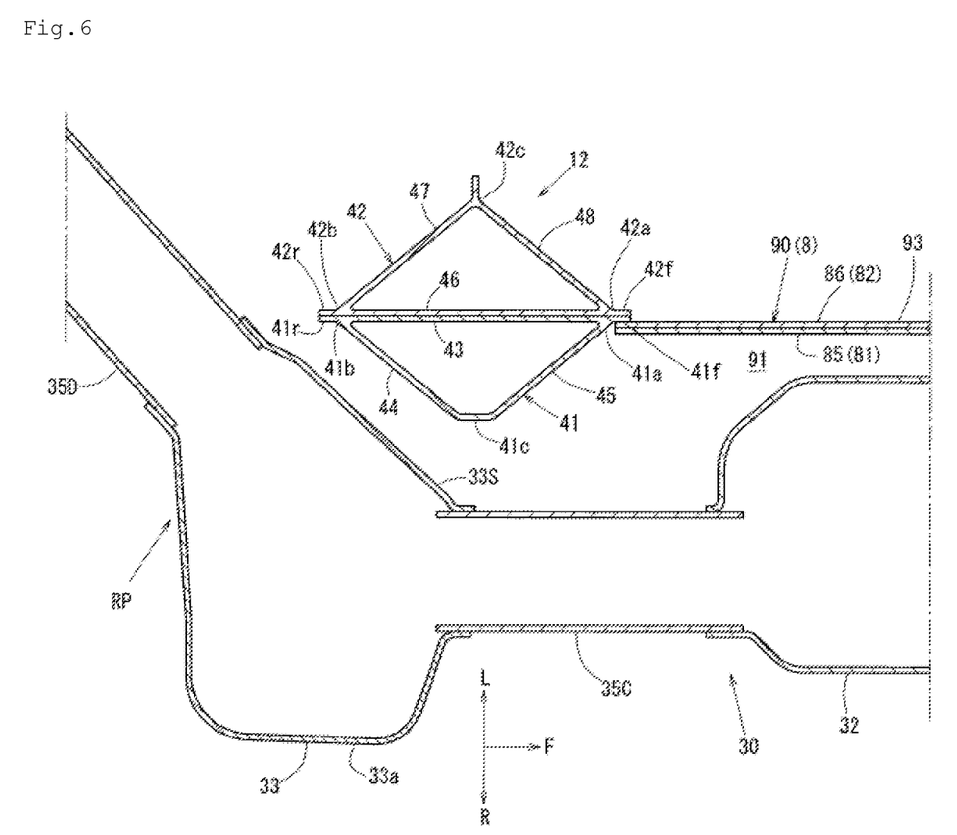
FIG. 6 is a cross-sectional view taken along line A-A in FIG. 4.

As illustrated in FIG. 6, in the above-described side sill upper 81 and side sill lower 82, the lower flange 85 and the upper flange 86 overlap with each other in a vehicle side view (in the vehicle up-down direction and the vehicle front-rear direction) and are welded to each other at this overlapping portion 93. As described above, in the side sill 8, the lower flange 85 and the upper flange 86 can be integrated by welding the mutually overlapping portion 93, forming a coupling wall 90 coupling vehicle-width-direction inner ends of the upper-side closed cross-section portion 83 and the lower-side closed cross-section portion 84 in the up-down direction.

Figure 4:
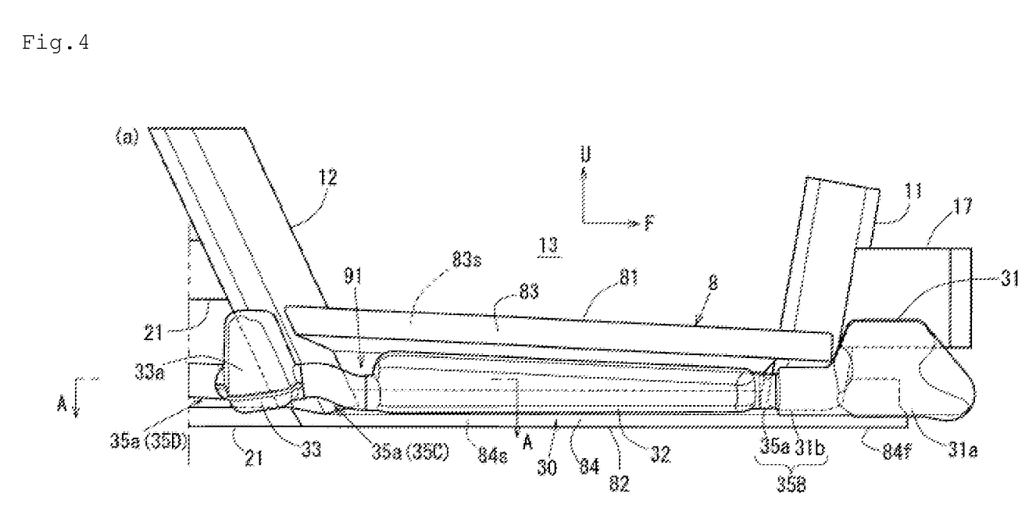
FIG. 4 is a left side view illustrating the main portion of the side vehicle body structure of the present embodiment.

Thereby, the side sill 8 is configured so that the closed cross-section portion 83 of the side sill upper 81 and the closed cross-section portion 84 of the side sill lower 82 are disposed so as to be spaced apart from each other in the up-down direction via the coupling wall 90 and, between these closed cross-section portions 83 and 84 on the upper and lower sides and the coupling wall 90, a recess 91 is provided which opens toward the vehicle-width-direction outer side (see FIGS. 4 and 6).

As illustrated in FIG. 2, the side sill 8 extends in the vehicle front-rear direction so as to form the lower edge 13c of the door opening 13 of a vehicle body side portion, as described above. The side sill 8 extends inclinedly in the vehicle front-rear direction in such a manner that the upper-side closed cross-section portion 83, namely, an upper end of the side sill 8, is located downward toward the front side (see FIGS. 2 and 4). Thereby, the lower edge 13c of the door opening 13 can be formed inclinedly so as to be located upward toward the vehicle rear side along the upper-side closed cross-section portion 83 (see FIG. 2). Accordingly, while an increase in the size of the door opening 13 over the entire vehicle front-rear direction is avoided, the vehicle front side can be located downward compared with the vehicle rear side, so that, when the occupant enters and exits the vehicle cabin space via the door opening 13, smooth accessibility is enabled.

The above-described side sill 8 and pillars 11 and 12 on the front and rear sides are integrally joined by arc welding (MIG welding, in this example). Specifically, as illustrated in FIG. 4, the upper-side closed cross-section portion 83 and the lower-side closed cross-section portion 84 in the present embodiment both extend in the vehicle front-rear direction so as to overlap with the hinge pillar 11 in the vehicle front-rear direction. In this example, in the upper-side closed cross-section portion 83, a front end extends up to substantially the same position as a front end of the hinge pillar 11 in the vehicle front-rear direction. On the other hand, the lower-side closed cross-section portion 84 includes a front extending portion 84f extending toward the vehicle front side relative to each of the front ends of the upper-side closed cross-section portion 83 and the hinge pillar 11 in the vehicle front-rear direction, and is integrally formed with the front extending portion 84f. The front extending portion 84f extends toward the vehicle front side until a front end thereof is located on the vehicle rear side relative to a front end of the tire stopper frame 17.

As illustrated in FIGS. 2 and 5, at a front portion of the side sill 8, the hinge pillar 11 is provided to protrude at the lower-side closed cross-section portion 84 in such a manner that the hinge pillar 11 projects toward the vehicle upper side from a vehicle-width-direction inner-side portion of the upper-side closed cross-section portion 83, in a posture inclined so as to be located on the vehicle front side toward the vehicle upper side. The hinge pillar 11 is an extruded member made of an aluminum alloy which is extruded in a rectangular shape in which a cross section orthogonal to the longitudinal direction inside forms a closed cross-section. In the hinge pillar 11 as described above, a portion facing each of the upper-side closed cross-section portion 83, the coupling wall 90, and the lower-side closed cross-section portion 84 is integrally joined thereto by arc welding or the like.

As illustrated in the same figures, at a rear portion of the side sill 8, the rear pillar 12 is provided to protrude in a columnar shape at the lower-side closed cross-section portion 84 in such a manner that the rear pillar 12 projects toward the vehicle upper side from the vehicle-width-direction inner-side portion of the upper-side closed cross-section portion 83, in a posture inclined so as to be located on the vehicle rear side toward the vehicle upper side. The rear pillar 12 is an extruded member made of an aluminum alloy which is extruded in a rectangular shape (in the rear pillar 12 on the vehicle right side, a rhombic shape) in which a cross section orthogonal to the longitudinal direction inside forms a closed cross-section (see FIG. 6). In the rear pillar 12 as described above, a portion facing each of the upper-side closed cross-section portion 83, the coupling wall 90, and the lower-side closed cross-section portion 84 is integrally joined thereto by arc welding or the like.

Here, as illustrated in FIG. 6, in the above-described rear pillar 12 on the vehicle right side, a cross section (horizontal cross section) orthogonal to the vehicle up-down direction is formed in a shape in which a portion between front and rear ends is located on the vehicle-width-direction outer side relative to these front and rear ends. Specifically, the rear pillar 12 includes closed cross-sectional structures 41 and 42 on the respective vehicle-width-direction outer and inner sides, and facing faces of the pair of these closed cross-sectional structures 41 and 42 in the vehicle width direction are formed by being joined so as to be in contact with each other.

In the pair of closed cross-sectional structures 41 and 42, the closed cross-sectional structure 41 located on the vehicle-width-direction outer side (vehicle width outer-side closed cross-sectional structure 41) has a cross section orthogonal to the vehicle up-down direction which is formed so as to have a triangular shape (truss structure) having top portions at front and rear ends 41a and 41b and a vehicle-width-direction outer end 41c.

The vehicle width outer-side closed cross-sectional structure 41 has a vehicle-width-direction inner wall 43 linearly extending substantially parallel to the vehicle front-rear direction, a rear-side inclined wall 44 inclined so as to be located on the vehicle-width-direction inner side toward the vehicle rear side so as to linearly connect the vehicle-width-direction outer end 41c and rear end 41b of the vehicle width outer-side closed cross-sectional structure 41, and a front-side inclined wall 45 inclined so as to be located on the vehicle-width-direction outer side toward the vehicle rear side so as to linearly connect the front end 41a and vehicle-width-direction outer end 41c of the vehicle width outer-side closed cross-sectional structure 41, and has the cross section orthogonal to the vehicle up-down direction which is formed in the triangular shape. The vehicle width outer-side closed cross-sectional structure 41 includes a front end flange 41f linearly projecting toward the vehicle front side from the front end, and a rear end flange 41r linearly projecting toward the vehicle rear side from the rear end.

In the pair of closed cross-sectional structures 41 and 42, the closed cross-sectional structure 42 located on the vehicle-width-direction inner side (vehicle width inner-side closed cross-sectional structure 42) has a cross section orthogonal to the vehicle up-down direction which is formed so as to have a triangular shape (truss structure) having top portions at front and rear ends 42a and 42b and a vehicle-width-direction inner end 42c.

The vehicle width inner-side closed cross-sectional structure 42 has a vehicle-width-direction outer wall 46 linearly extending substantially parallel to the vehicle front-rear direction, a rear-side inclined wall 47 inclined so as to be located on the vehicle-width-direction outer side toward the vehicle rear side so as to linearly connect the vehicle-width-direction inner end 42c and rear end 42b of the vehicle width outer-side closed cross-sectional structure 41, and a front-side inclined wall 48 inclined so as to be located on the vehicle-width-direction inner side toward the vehicle rear side so as to linearly connect the front end 42a and vehicle-width-direction inner end 42c of the vehicle width outer-side closed cross-sectional structure 41, and has the cross section orthogonal to the vehicle up-down direction which is formed in the triangular shape. The vehicle width outer-side closed cross-sectional structure 41 includes a front end flange 42f linearly projecting toward the vehicle front side from the front end, and a rear end flange 42r linearly projecting toward the vehicle rear side from the rear end 42b.

In the rear pillar 12, the vehicle-width-direction inner wall 43 of the vehicle width outer-side closed cross-sectional structure 41 and the vehicle-width-direction outer wall 46 of the vehicle width inner-side closed cross-sectional structure 42 are disposed so as to be in contact with each other in the vehicle width direction. The front end flanges 41f and 42f of the respective closed cross-sectional structures 41 and 42 are joined by welding, and the rear end flanges 41r and 42r thereof are joined by welding. Thereby, the closed cross-sectional structures 41 and 42 whose cross sections orthogonal to the vehicle up-down direction each have the triangular shape are joined as described above, so that the rear pillar 12 can be formed in a rhombic shape having the joint-like vehicle-width-direction inner wall 43 and vehicle-width-direction outer wall 46 inside which extend in the vehicle front-rear direction.

As illustrated in FIGS. 1 and 2, in the exhaust apparatus 30, each of the GPF 31, the first pre-silencer 32, and the second pre-silencer 33 is disposed in this order toward the vehicle rear side along a lower portion of the vehicle body side portion (a vehicle right-side portion, in this example).

Specifically, the GPF 31 includes the body 31a in which the filter is incorporated, and a connection portion 31b formed to have a smaller width than the body 31a. In the GPF 31, the body 31a is mainly disposed, in a vehicle body lower portion, on the vehicle front side relative to the hinge pillar 11 and on the vehicle-width-direction outer side relative to the tire stopper frame 17.

Figure 3:
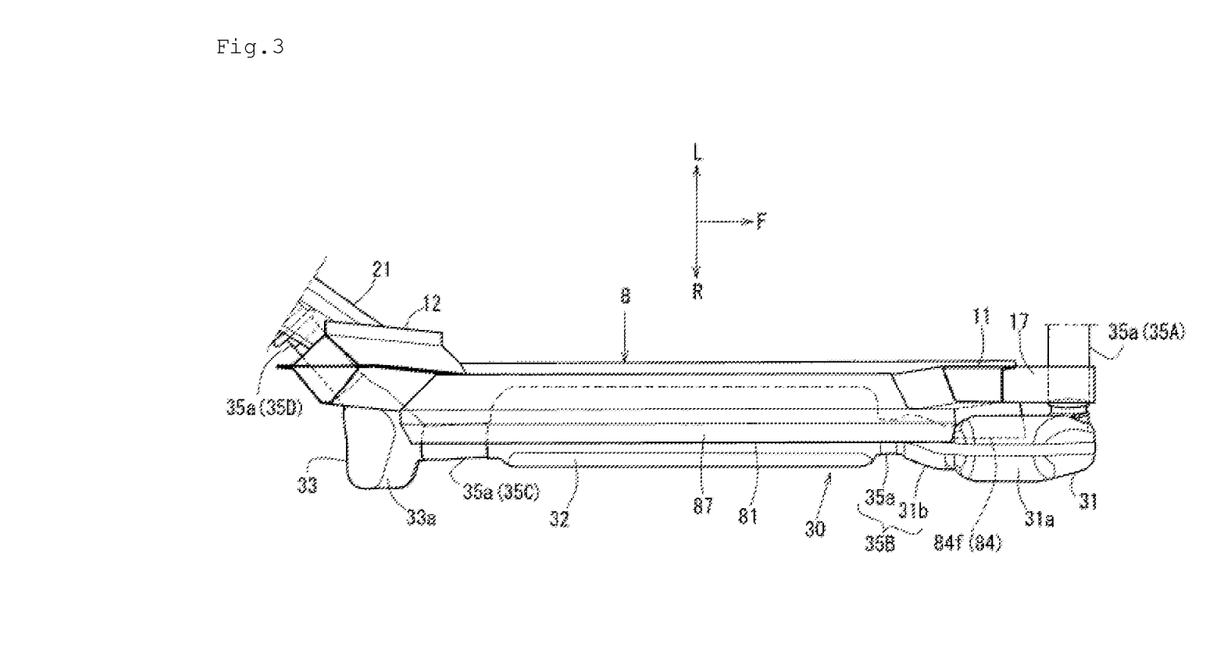
FIG. 3 is a plan view illustrating a main portion of the side vehicle body structure of the present embodiment.

As illustrated in FIGS. 3 and 4, the above-described front extending portion 84f provided at a front portion of the lower-side closed cross-section portion 84 of the side sill 8 extends forward relative to a position corresponding to the front end of the hinge pillar 11 in the vehicle front-rear direction. That is, the front extending portion 84f extends up to immediately under the GPF 31. The GPF 31 is supported so as to be placed on a top face of the front extending portion 84f.

As illustrated in FIG. 1, the body 31a of the GPF 31 and the engine 23 (exhaust manifold 24) provided on the vehicle-width-direction inner side relative to the body 31a are connected by the connection part 85A (hereinafter referred to as the "first connection part 85A") extending in the vehicle width direction between these. The first connection part 85A is formed by the exhaust pipe 35a provided as a part of the exhaust apparatus 30. In a vehicle plan view, the tire stopper frame 17 intervenes between the GPF 31 and the engine 23, while the first connection part 85A extends in the vehicle width direction across a space provided below the tire stopper frame 17.

As illustrated in FIGS. 2 to 4, the first pre-silencer 32 is formed to have a long length in the vehicle front-rear direction along the side sill 8 provided at the lower edge 13c of the door opening 13. The first pre-silencer 32 is formed to have substantially a constant length in the vehicle width direction over the full length in the vehicle front-rear direction and formed in a vehicle side view shape in which the first pre-silencer 32 is inclined so as to become gradually higher toward the vehicle rear side.

As illustrated in FIG. 5, the recess 91 is formed to have a length in the vehicle front-rear direction which is slightly longer than that of the first pre-silencer 32 in the vehicle front-rear direction. The recess 91 has a length in the vehicle up-down direction which is slightly longer than that of the first pre-silencer 32 in the vehicle up-down direction, and is formed in an inclined shape so as to become gradually higher toward the vehicle rear side corresponding to the above-described vehicle side view shape of the first pre-silencer 32.

As illustrated in FIGS. 2 and 3, the first pre-silencer 32 is disposed on the vehicle-width-direction outer side relative to a vehicle-width-direction inner end of the side sill 8 in such a manner that at least a part of the first pre-silencer 32 in the vehicle width direction overlaps with the side sill 8. That is, the entire first pre-silencer 32 except for an outer-side portion thereof in the vehicle width direction is accommodated in the recess 91 of the side sill 8 over the full length of the vehicle front-rear direction. In this state, a vehicle-width-direction inner end of the first pre-silencer 32 is disposed on the vehicle-width-direction outer side relative to the coupling wall 90 (vehicle width inner wall) (see FIG. 6) of the side sill 8, and the first pre-silencer 32 is supported so as to be placed on a top face of the lower-side closed cross-section portion 84. Thereby, the side sill upper 81 is provided so as to cover the first pre-silencer 32 from immediately thereabove.

As illustrated in FIGS. 2 to 4, the GPF 31 disposed on the vehicle front side of the hinge pillar 11 and the first pre-silencer 32 disposed on the vehicle rear side thereof are connected by the connection part 35B (hereinafter referred to as the "second connection part 35B"). The second connection part 35B is formed by the exhaust pipe 35a and the connection portion 31b provided in the GPF 31. The connection portion 31b provided in the GPF 31 is formed in a pipe shape extending toward the vehicle rear side from a rear end of the body 31a of the GPF 31 and is connected to the exhaust pipe 35a so as to fit the exhaust pipe 35a from a front portion thereof. As illustrated in FIG. 3, the second connection part 35B is formed to have a smaller length in the vehicle width direction than both the GPF 31 and the first pre-silencer 32.

Figure 7:
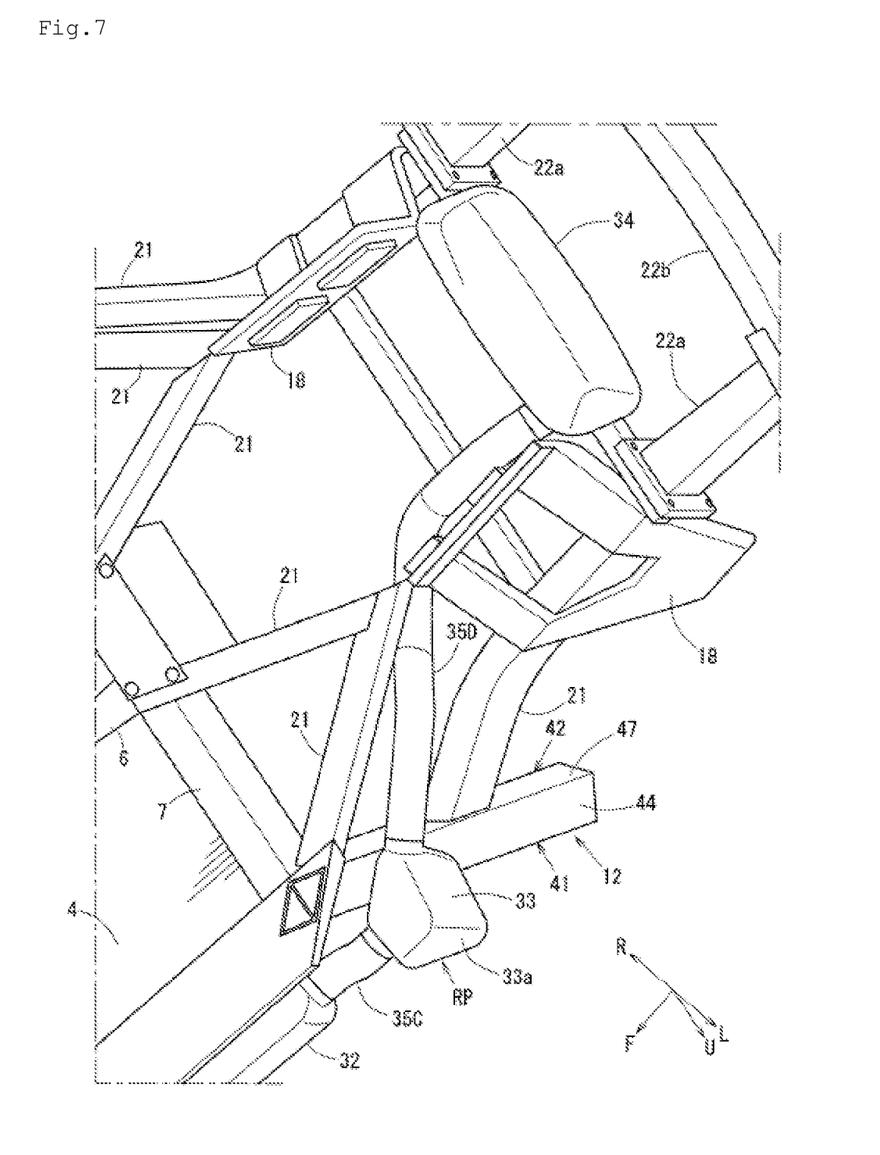
FIG. 7 is a perspective view of a periphery of a rear portion of a side portion on the right side of the vehicle of the present embodiment as viewed from below.

As illustrated in FIGS. 6 and 7, a body 33a of the second pre-silencer 33 is formed to have a box-like body case, and, in the exhaust system members 31, 32, and 33 disposed at the lower portion of the vehicle body side portion (a vehicle body right-side portion, in this example), the second pre-silencer 33 is disposed on a vehicle rearmost portion (see FIGS. 2 to 4). Thus, as illustrated in FIGS. 6 and 7, the second pre-silencer 33 is disposed at a going-around portion RP, with respect to the rear pillar 12, from forward to rearward and from the outer side to the inner side in the vehicle width direction.

As illustrated in FIG. 6, the second pre-silencer 33 has, at a portion thereof which faces the rear pillar 12, a facing face 33S facing, in a vehicle plan view, the rear-side inclined wall 44 provided on the vehicle-width-direction outer side of the rear pillar 12, corresponding to the rear pillar 12 whose cross section orthogonal to the vehicle up-down direction has the rhombic shape. This facing face 33S is formed to be inclined to the vehicle-width-direction inner side toward the vehicle rear side corresponding to a disposition location and disposition angle of the rear-side inclined wall 44 in a vehicle plan view. That is, at the above-described going-around portion RP with respect to the rear pillar 12, the second pre-silencer 33 goes around in such a manner that the facing face 33S to the rear-side inclined wall 44 runs along the rear-side inclined wall 44 provided in the rear pillar 12.

Thereby, as illustrated in FIGS. 6 and 7, while the cross section of the rear pillar 12 which is orthogonal to the vehicle up-down direction is maintained, the second pre-silencer 33, while being as close as possible to the rear pillar 12, can be disposed at the going-around portion RP with respect to the rear pillar 12 in a moderately bent shape in a vehicle plan view. For convenience, the rear pillar 12 in FIG. 7 is illustrated in a simplified manner.

The second pre-silencer 33 as described above is connected to the connection part 35C (hereinafter referred to as the "third connection part 35C") connecting to the first pre-silencer 32 provided on the vehicle front side at a front end portion of the body 33a, and can be connected to the connection part 35D (hereinafter referred to as the "fourth connection part 35D") connecting to the main silencer 34 provided at the vehicle-width-direction center and on the vehicle rear side, on the vehicle-width-direction inner side of the body 31a and at a vehicle rear portion.

As illustrated in FIGS. 1, 2, 6, and 7, the second pre-silencer 33 as described above can be smoothly connected to the third connection part 35C connecting to the first pre-silencer 32 provided on the vehicle front side at the front end portion of the body 33a, without having a bent portion or a greatly curved portion. Similarly, the second pre-silencer 33 can be smoothly connected to the fourth connection part 35D connecting to the main silencer 34 (see FIG. 1) provided at the vehicle-width-direction center and on the vehicle rear side, on the vehicle-width-direction inner side of the body 33a and at the vehicle rear portion, without having a bent portion or a greatly curved portion.

As illustrated in FIGS. 1 and 2, the above-described side vehicle body structure of the vehicle in the present embodiment is a side vehicle body structure of a vehicle which includes the engine 23 (internal combustion engine) (see FIG. 1) equipped on the front side of the dash panel 9 (partition wall) defining the front edge of the vehicle cabin space 1s, the exhaust apparatus 30 through which exhaust gas exhausted from the engine 23 passes, the side sill 8 extending along the vehicle front-rear direction so as to form the lower edge 13d of the door opening 13 (see FIG. 2) formed at the side portion of the vehicle, and the rear pillar 12 (pillar) forming the rear edge 13r of the door opening 13 and extending upward from a rear-side portion of the side sill 8, wherein the exhaust apparatus 30 is disposed (routed) along the vehicle front-rear direction on the vehicle-width-direction outer side relative to the side sill 8; as illustrated in FIGS. 1 to 4, 6, and 7, the second pre-silencer 33 (exhaust system member) provided in the exhaust apparatus 30 is located at the going-around portion RP, with respect to the rear pillar 12, from the front side to the rear side and from the outer side to the inner side in the vehicle width direction; and, as illustrated in FIG. 6, the rear pillar 12 has the cross section orthogonal to the vehicle up-down direction which has the shape in which the portion between the front end 41a and the rear end 41b is located on the vehicle-width-direction outer side relative to these front and rear ends.

According to this configuration, while the size of the cross section of the rear pillar 12 which is orthogonal to the vehicle up-down direction; i.e., rigidity of the vehicle body and a shock absorption performance thereof, are ensured, there is no need to form the second pre-silencer 33 in a bent shape corresponding to, in a plan view, the corner shape of the going-around portion RP, with respect to the rear pillar 12, from the front side to the rear side and from the outer side to the inner side in the vehicle width direction, and exhaust gas can smoothly flow in the second pre-silencer 33 as the exhaust system member disposed at the going-around portion RP.

Furthermore, while exhaust gas smoothly flows in the second pre-silencer 33 disposed at the going-around portion RP as described above, it is possible to avoid curving in which the second pre-silencer 33 detours toward the vehicle-width-direction outer side at the going-around portion RP, that is, avoidance of widening of the vehicle body.

In short, it is possible to achieve all the goals of ensuring the rigidity of the vehicle body and the shock absorption performance thereof, smoothing exhaust of the second pre-silencer 33, and avoiding widening of the vehicle body.

In an aspect of the present disclosure, as illustrated in FIG. 6, the rear pillar 12 includes the vehicle width outer-side closed cross-sectional structure 41 (closed cross-sectional structure) having the cross section orthogonal to the vehicle up-down direction, in which the cross section has the triangular shape having the top portions at the front and rear ends 41a and 41b and the vehicle-width-direction outer end 41c. According to this configuration, the vehicle width outer-side closed cross-sectional structure 41 can be formed in which the cross section orthogonal to the vehicle up-down direction has a truss structure, so that rigidity of the rear pillar 12 can be enhanced.

In another aspect of the present disclosure, as illustrated in FIG. 6, the rear pillar 12 is formed by the vehicle width outer-side closed cross-sectional structure 41 and the vehicle width inner-side closed cross-sectional structure 42 disposed on the vehicle-width-direction inner side relative to the vehicle width outer-side closed cross-sectional structure 41 and having the cross section orthogonal to the vehicle up-down direction, in which the cross section has the triangular shape having the top portions at the front and rear ends 42a and 42b and the vehicle-width-direction inner end 42c, and the facing faces (the vehicle-width-direction inner wall 43 and the vehicle-width-direction outer wall 46) of the vehicle width outer-side closed cross-sectional structure 41 and the vehicle width inner-side closed cross-sectional structure 42 in the vehicle width direction are formed by being joined so as to be in contact with each other. According to this configuration, the rear pillar 12 can be formed by combining the pair of closed cross-sectional structures 41 and 42 whose cross sections orthogonal to the vehicle up-down direction each have a truss structure, so that the rigidity thereof can be further enhanced.

The present disclosure is not limited to only the configurations of the above-described embodiment and can be formed in various embodiments. For example, as in the present embodiment, in the rear pillar 12, the cross section orthogonal to the vehicle up-down direction is formed in a substantially triangular shape having top portions at the front and rear ends 41a and 41b and the vehicle-width-direction outer end 41c, so that the cross section orthogonal to the vehicle up-down direction can have a truss structure. Thus, it is preferable in that the rear pillar 12 can be formed as a strong structure.

Figure 8:
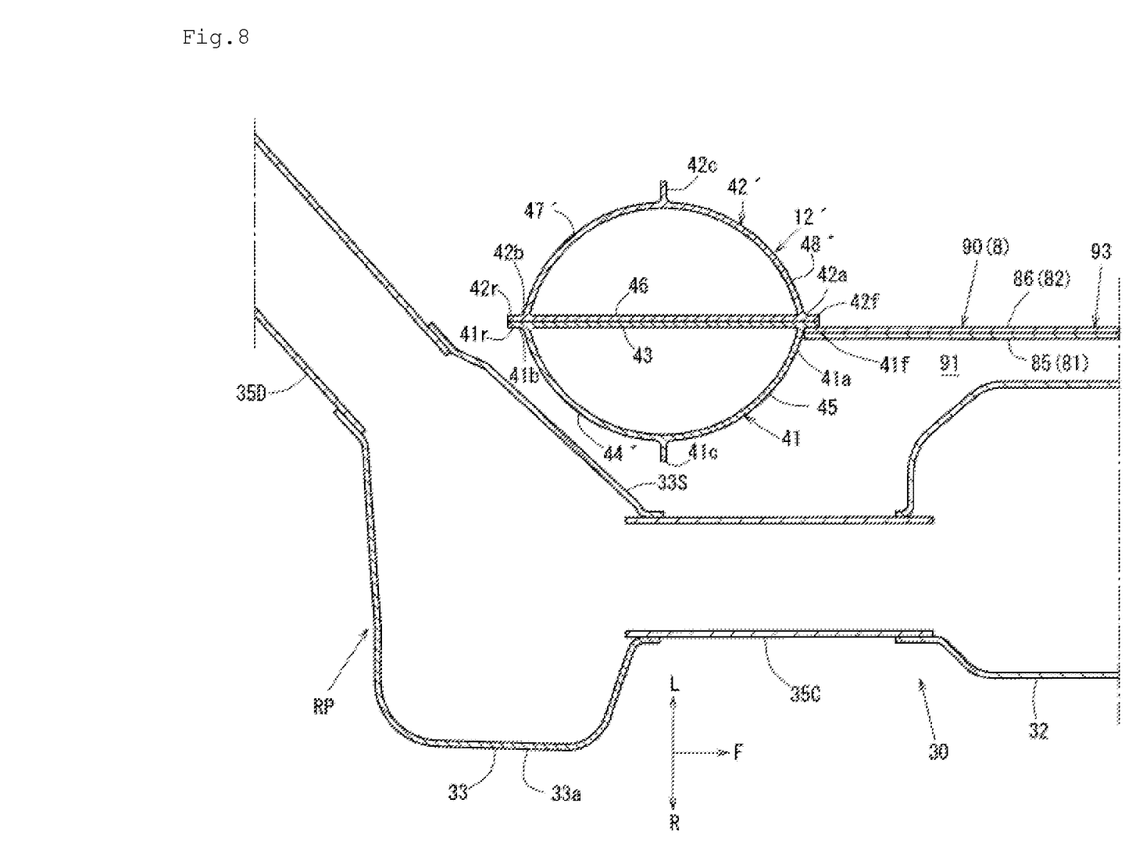
FIG. 8 is a cross-sectional view illustrating a modification of the side vehicle body structure of the present embodiment corresponding to FIG. 6.

In the pillar of the present disclosure, the cross section orthogonal to the vehicle up-down direction is not limited to being formed in a substantially triangular shape as in the rear pillar 12 of the above-described embodiment, and may be formed in an arc shape as illustrated in, for example, FIG. 8, as long as the cross section has a shape in which the portion between the front and rear ends is located on the vehicle-width-direction outer side relative to these front and rear ends.

In such a case, as illustrated in FIG. 8, in a configuration of a pillar 12' in which, in the vehicle width direction, facing faces 43' and 46' of closed cross-sectional structures 41' and 42' provided on the respective vehicle-width-direction outer and inner sides are joined so as to be in contact with each other, non-facing faces 44', 45', 44', and 48' of the closed cross-sectional structures 41' and 42' on the respective vehicle-width-direction outer and inner sides are formed in an arc shape bulging in a direction of separating from each other, so that a cross section of the pillar 12' which is orthogonal to the vehicle up-down direction can have an elliptical shape.

What is claimed is:

1. A side vehicle body structure of a vehicle, comprising:
an internal combustion engine;
an exhaust apparatus through which exhaust gas exhausted from the internal combustion engine passes; and
a pillar extending in an up-down direction at a rear-side portion of a vehicle body structure extending in a vehicle front-rear direction,
wherein the exhaust apparatus is disposed along the vehicle front-rear direction on a vehicle-width-direction outer side relative to the vehicle body structure,
an exhaust system member provided in the exhaust apparatus is located at a going-around portion, with respect to the pillar, from a front side to a rear side and from an outer side to an inner side in a vehicle width direction, and
the pillar has a cross section orthogonal to a vehicle up-down direction, the cross section having a shape in which a portion between front and rear ends is located on the vehicle-width-direction outer side relative to these front and rear ends,
wherein the pillar comprises a closed cross-sectional structure having a cross section orthogonal to the vehicle up-down direction, the cross section having a triangular shape comprising top portions at front and rear ends and on the vehicle-width-direction outer side.

2. The side vehicle body structure of a vehicle according to claim 1,
wherein the pillar comprises:
a vehicle width outer-side closed cross-sectional structure as the closed cross-sectional structure, and
a vehicle width inner-side closed cross-sectional structure disposed on a vehicle-width-direction inner side relative to the vehicle width outer-side closed cross-sectional structure and having a cross section orthogonal to the vehicle up-down direction, the cross section having a triangular shape comprising top portions at front and rear ends and on the vehicle-width-direction inner side, and
wherein facing faces of the vehicle width outer-side closed cross-sectional structure and the vehicle width inner-side closed cross-sectional structure in the vehicle width direction are in contact with each other.

3. The side vehicle body structure of a vehicle according to claim 1, wherein the exhaust system member is a silencer.

4. A side vehicle body structure of a vehicle, comprising:
an internal combustion engine;
an exhaust apparatus through which exhaust gas exhausted from the internal combustion engine passes; and
a pillar extending in an up-down direction at a rear-side portion of a vehicle body structure extending in a vehicle front-rear direction,
wherein the exhaust apparatus is disposed along the vehicle front-rear direction on a vehicle-width-direction outer side relative to the vehicle body structure,
an exhaust system member provided in the exhaust apparatus is located at a going-around portion, with respect to the pillar, from a front side to a rear side and from an outer side to an inner side in a vehicle width direction, and
the pillar has a cross section orthogonal to a vehicle up-down direction, the cross section having a shape in which a portion between front and rear ends is located on the vehicle-width-direction outer side relative to these front and rear ends, wherein
the exhaust system member is a silencer;
the pillar cross-section orthogonal to the vehicle up-down direction has a rhombic shape; and
the silencer has, at a portion thereof facing the pillar, a facing face facing, in a vehicle plan view, a rear-side inclined wall of the vehicle-width-direction outer side of the pillar corresponding to the pillar cross-section.

5. The side vehicle body structure of a vehicle according to claim 4, wherein the silencer is shaped at the going-around portion such that the facing face extends along the rear-side inclined wall of the pillar.

* * * * *